United States Patent [19]

Hart

[11] Patent Number: 4,473,093

[45] Date of Patent: Sep. 25, 1984

[54] FLUID CONTROL VALVE

[75] Inventor: John E. Hart, Matthews, N.C.

[73] Assignee: Ingersoll-Rand Co., Woodcliff Lake, N.J.

[21] Appl. No.: 505,451

[22] Filed: Jun. 17, 1983

[51] Int. Cl.³ ............................................. F16K 15/18
[52] U.S. Cl. .................................. 137/522; 137/529; 417/282; 417/295
[58] Field of Search ................ 137/522, 529; 417/282, 417/295

[56] References Cited

U.S. PATENT DOCUMENTS

| | | | |
|---|---|---|---|
| 3,289,686 | 12/1966 | Tyer | 137/529 X |
| 3,602,610 | 8/1971 | Bloom | 417/295 X |
| 4,064,906 | 12/1977 | Berg | 137/529 |
| 4,362,475 | 12/1982 | Seitz | 417/295 |

FOREIGN PATENT DOCUMENTS 270420  8/1970  U.S.S.R. ............................ 137/529

Primary Examiner—Robert G. Nilson
Attorney, Agent, or Firm—B. J. Murphy

[57]  ABSTRACT

The valve, in the exemplary embodiment shown, comprises a gas inlet or intake valve for use with a gas compressor. It has a valve body with a gas inlet opening and a gas discharge opening, the latter for communication with the gas inlet of a compressor. A pair of concentrically-engaged pistons, relatively movable therebetween, cooperate to open, close, and throttle communication between the valve inlet and discharge openings. A first, compression spring, reactive from the valve body, urges the piston pair in a first closure disposition, to prevent gas flow through the valve body, and a second, compression spring, reactive from one of the pistons of the pair thereof, urges the other piston to a second, open disposition, to accommodate gas flow through the valve body.

9 Claims, 3 Drawing Figures

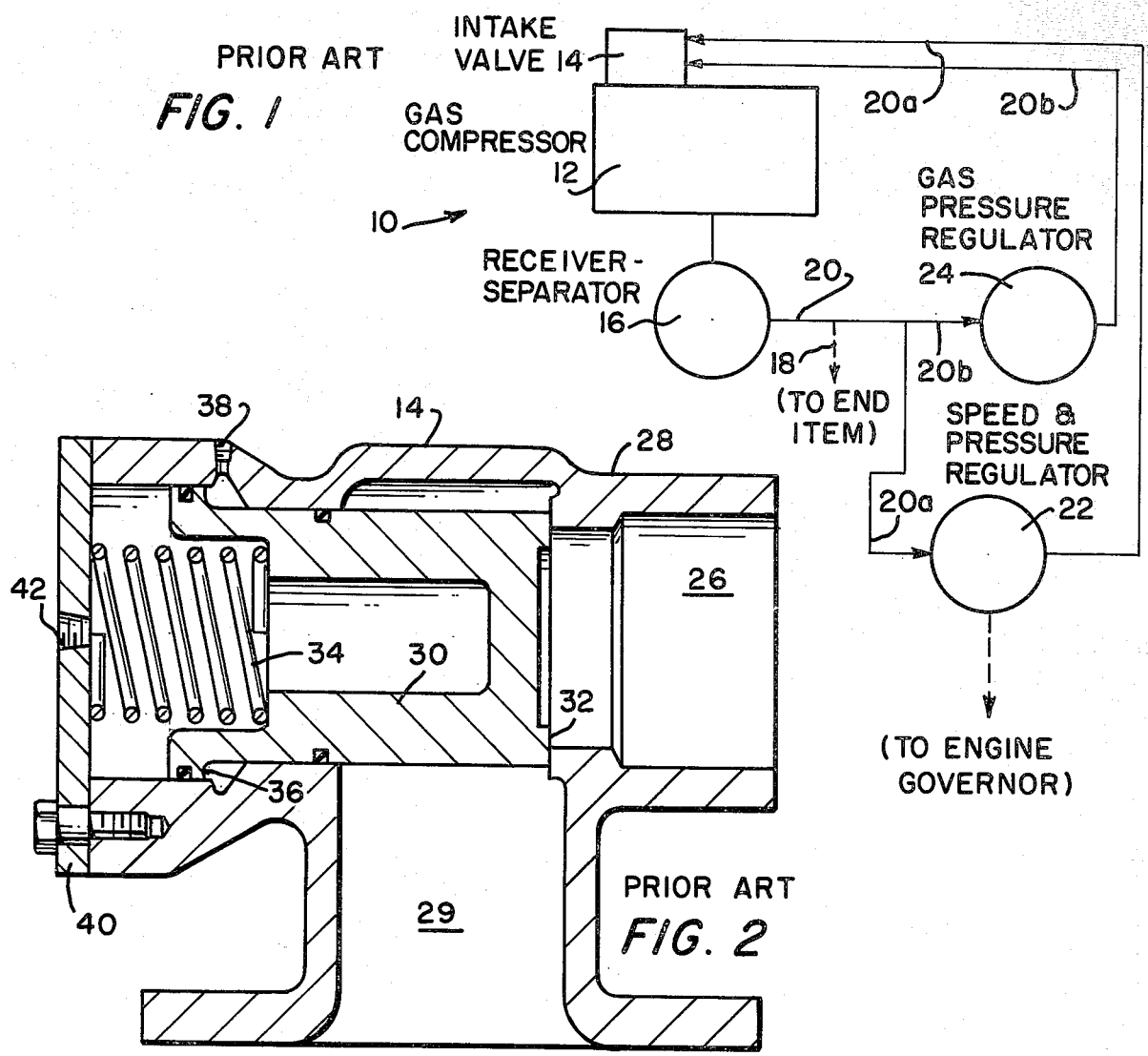
PRIOR ART FIG. 1
PRIOR ART FIG. 2
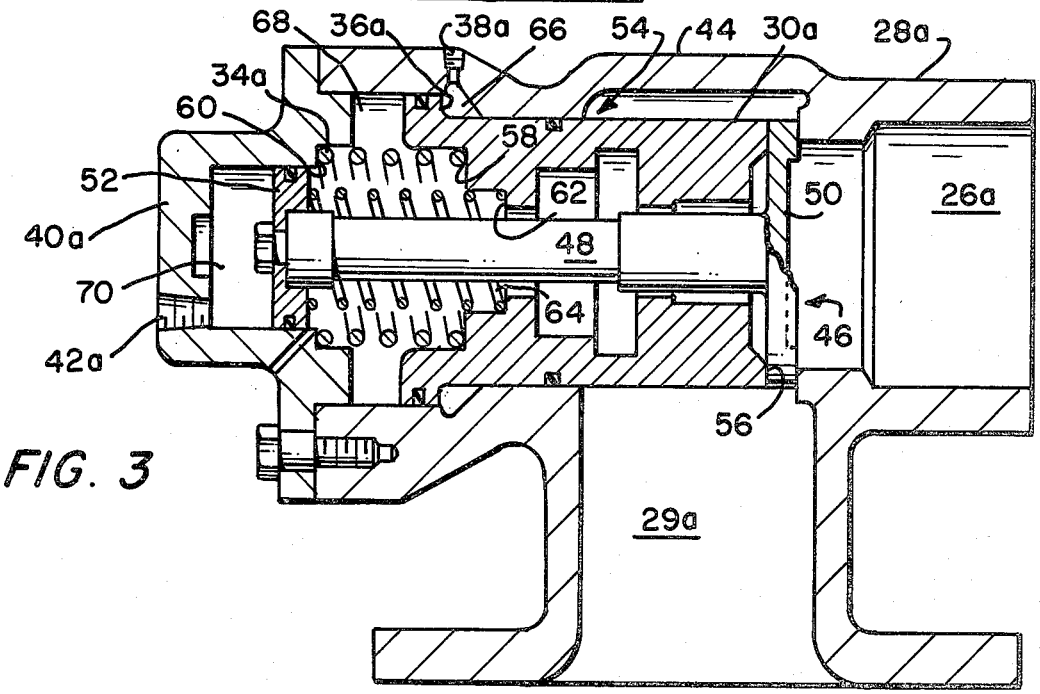
FIG. 3

FLUID CONTROL VALVE

This invention pertains to fluid control valves, and in particular to such valves which have a valving element therewithin, resiliently biased, to control fluid communication therethrough between fluid ports or openings formed in the body of the valve.

Valves of the aforesaid type are commonly used as gas inlet or intake valves for gas compressors and, for exemplary purposes only, the fluid control valve of the instant invention will be described and illustrated in functioning thereof in association with a gas compressor.

To minimize gas compressor starting torque, it is commonly required to have a closed gas intake valve at startup. Accordingly, the gas compressor will be unloaded and capable of starting with less torque. Unloading of the gas compressor is typically done by providing a spring force against the intake valve closure plate or piston. To load the compressor, the intake valve plate or closure is opened by supplying a load pressure to overcome the closing spring force. To close the valve or to modulate the compressor loading, a control pressure is supplied to fully or partially close the valve plate or closure, respectively.

With the prior art single piston and spring designs, the position of the valve plate or closure, during compressor loading modulation, is a function of three things: spring force, control pressure, and load pressure. Instability results from this because the spring must be designed to satisfy two functions. It must provide the unloading spring force and the control or modulating force as well.

It is an object of this invention to set forth a novel fluid control valve in which such aforesaid instability is avoided. Particularly it is an object of this invention to disclose a novel fluid control valve comprising a valve housing; said housing having a first opening formed therein for admitting fluid therethrough into said housing; said housing also having a second opening formed therein for discharging fluid therethrough from said housing; closure means within said housing interposed between said openings, movable for controlling fluid communication between said openings; first biasing means, within said housing, for urging said closure means to a given disposition in which fluid communication between said openings is closed; and second biasing means, within said housing, cooperative with said first biasing means, for urging said closure means to a disposition, other than said given disposition, in which fluid communication between said openings is opened.

Further objects of this invention, as well as the novel features thereof, will become more apparent by reference to the following description taken in conjunction with the accompanying figures in which:

FIG. 1 is a schematic diagram of a known type of compressed gas system, practiced in the prior art, having a gas compressor, receiver-separator, and regulators, the gas compressor having an intake valve;

FIG. 2 is an axial cross-sectional view of a prior art intake valve such as is in common use; and FIG. 3 is a view like that of FIG. 2 illustrative, however, of a fluid control valve, according to an embodiment of the invention, usable in the system of FIG. 1, for example.

The system 10 of FIG. 1, shown only with its basic elements, is familiar to those skilled in this art and, consequently, requires no extensive explanation here. Briefly, however, the system 10 comprises a gas compressor 12 having a gas inlet controlling intake valve 14. The compressed gas and oil mist product of the compressor 12 is received in the receiver-separator 16. The latter separates out the oil content and stores the compressed gas. The produced compressed gas is available to a using end item, via a compressed gas supply line 18 shown only in dashed line.

The compressed gas discharge line 20 proceeds to branches 20a and 20b. The former communicates with a speed and pressure regulator 22, and thence with the intake valve 14. Branch 20b communicates with a gas pressure regulator 24, and thence with the intake valve 14 also. Regulator 22 senses the gas pressure in the receiver-separator 16 and modulates the gas-admittance opening in the valve 14. The regulator 24 comprises the component which holds the gas-admittance opening, in the valve 14, open until gas pressure in the receiver-separator achieves some predetermined value.

The prior art intake valve 14, shown in FIG. 2 in detail, has a gas inlet 26 formed in the body 28 thereof, and a gas outlet 29 as well. A piston 30, slidably disposed in the body 28, has an end face 32 which defines a closure for the inlet 26. A single spring 34 urges the piston 30 in closure of the inlet. The piston 30 has a circumferential land 36 which defines a fluid impingement surface, and the body 28 has a port 38 formed therein which opens onto the land 36. Referencing back to FIG. 1, branch 20b comprises the conduit which supplies a "load" gas pressure to port 38 to move the piston 30 to an open position.

Body 28 of valve 14 has an end cap 40 which has a second port 42 formed therethrough. The latter receives a "control" gas pressure, from branch 20a, to modulate the positioning of the piston 30. As noted, and as can be seen, the one spring 34 must yield before the "load" pressure, to allow the valve 14 to open fully, and yet it needs to have sufficient force to assist the "control" pressure in modulating the disposition of the piston 30. Instability arises from this arrangement, and the piston 30 is given to hunting between positionings. Simply, a single spring 34 is not adequate for optimum regulation; too, it would be more desirable to have a second piston biased by a second spring to control only the modulated gas admittance of the intake valve.

The fluid control valve 44 of my invention, shown in FIG. 3, defines an improvement useful, particularly, in an application such as that of system 10. In FIG. 3, same or similar components, as those shown in FIG. 2, bear same or similar index numbers.

Valve 44 has a gas inlet 26a formed in the body 28a thereof, and a gas outlet 29a, as shown. The novel valve 44 has a closure 46, the same comprising a piston rod 48, a piston head 50, and an end disk 52. Additionally a first biasing means 54, comprising a piston 30a and a spring 34a, is slidably disposed in the body 28a to urge the closure 46 into closure of the inlet 26a. Piston 30a is centrally bored, slidably to receive the rod 48 and to serve as a guide and keeper for closure 46. Piston 30a has an end face 56 which engages piston head 50, and an inner, annular land or rib 58 which seats one end of spring 34a. The other end of spring 34a reacts from an inner, annular land 60 formed in the body 28a.

Piston 30a has a second, inner, annular land or rib 62 which seats one end of a second spring 64; the other end of spring 64 bears against the disk 52. Accordingly, when piston 30a and closure 46 are in an "open" positioning (i.e., to the left of the "closed" positioning shown in FIG. 3) spring 64 modulatingly reacts from land 62.

Body 28a has a "load" pressure port 38a which opens onto the fluid impingement surface defined by the land 36a of piston 30a. Hence, the gas pressure admitted via branch 20b causes the piston 30a, and spring-loaded closure 46, to retract from the inlet 26a. Two variable-volume chambers 66 and 68, formed on opposite sides of the land 36a, change in volume as the land 36a retracts. A third variable-volume chamber 70, defined between the disk 52 and the end cap 40a of the body 28a, also diminishes in volume upon the retraction of the closure 46.

A port 42a formed in the end cap 40a is provided for communication with branch 20a, whereby the "control" gas pressure is admitted into chamber 70 to modulate the positioning of the closure 46.

It will be recognized that, following the retraction of the piston 30a and the closure 46, only spring 64 biases the closure 46. Too, closure 46 is independently operative, in response to the "control" gas pressure, with the compressor 12 in the loaded mode. Spring 34a and piston 30a do not supervise its positioning. Accordingly, closure 46 is fully and faithfully responsive to the modulating "control" gas pressure, and is not subject to erratic hunting.

While I have described my invention in connection with a specific embodiment thereof, it is to be clearly understood that this is done only by way of example and not as a limitation to the scope of my invention, as set forth in the objects thereof and in the appended claims.

I claim:

1. A fluid control valve, comprising:
   a valve housing;
   said housing having a first opening formed therein for admitting fluid therethrough into said housing;
   said housing also having a second opening formed therein for discharging fluid therethrough from said housing;
   closure means within said housing, interposed between said openings, movable for controlling fluid communication between said openings;
   first biasing means, within said housing, for urging said closure means to a given disposition in which fluid communication between said openings is closed; and
   second biasing means, within said housing, cooperative with said first biasing means, for urging said closure means to a disposition, other than said given disposition, in which fluid communication between said openings is opened; wherein
   said first biasing means and said closure means comprise a plurality of pistons mutually-slidably engaged within said housing;
   a first of said pistons comprises wall means for closure of, and removal from, one of said openings;
   a second of said pistons comprises a keeper for engaging said wall means and for moving said wall means into closure of said one opening;
   one of said first and second biasing means is resiliently interposed between said housing and said second piston; and
   the other of said first and second biasing means is resiliently interposed between said first and second pistons.

2. A fluid control valve, according to claim 1, wherein:
   said second piston has a fluid-impingement land; and
   said housing has a given port formed therein which opens internally onto said land.

3. A fluid control valve, according to claim 2, wherein:
   said first piston has a fluid-impingement face; and
   said housing has another port formed therein which opens internally onto said face.

4. A fluid control valve, according to claim 1, wherein:
   said second piston comprises means for guiding movement of said first piston.

5. A fluid control valve, according to claim 4, wherein:
   said first piston has a disk fixed to an end thereof;
   said housing has an inside, circumferential surface;
   said disk is slidably engaged with said circumferential surface;
   said first piston is disposed for translational movement within said housing; and
   said guiding means and said circumferential surface cooperatively support said first piston during translational movement thereof.

6. A fluid control valve, according to claim 3, wherein:
   said pistons and said housing have surfaces which cooperatively define three, variable-volume chambers within said housing;
   said given port opens onto one of said chamber; and
   said another port opens onto another of said chambers.

7. A fluid control valve, according to claim 6, wherein:
   the third of said chambers is intermediate said one and another chambers.

8. A fluid control valve, according to claim 6, wherein:
   said second piston is disposed for translational movement within said housing; and
   said second piston is translatable, within said housing, independent of said first piston.

9. A fluid control valve, according to claim 1, wherein:
   said second piston has a pair of concentric ribs;
   said one biasing means is resiliently engaged with one of said ribs; and
   said other biasing means is resiliently engaged with the other of said ribs.

* * * * *